US011195410B2

(12) United States Patent
Adireddy et al.

(10) Patent No.: US 11,195,410 B2
(45) Date of Patent: Dec. 7, 2021

(54) SYSTEM AND METHOD FOR GENERATING A TRAFFIC HEAT MAP

(71) Applicant: Continental Automotive Systems, Inc., Auburn Hills, MI (US)

(72) Inventors: Ganesh Adireddy, Bloomfield Hills, MI (US); Bastian Zydek, Bad Soden (DE); Kuldeep Shah, Mountain View, CA (US); Joshua Frankfurth, Rochester Hills, MI (US); Hongzhou Wang, San Jose, CA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 198 days.

(21) Appl. No.: 16/241,376

(22) Filed: Jan. 7, 2019

(65) Prior Publication Data
US 2019/0213873 A1  Jul. 11, 2019

Related U.S. Application Data

(60) Provisional application No. 62/615,123, filed on Jan. 9, 2018.

(51) Int. Cl.
*G08G 1/01* (2006.01)
*G06F 16/29* (2019.01)
(Continued)

(52) U.S. Cl.
CPC .......... *G08G 1/0129* (2013.01); *G06F 16/29* (2019.01); *G08G 1/015* (2013.01); *G08G 1/0116* (2013.01);
(Continued)

(58) Field of Classification Search
CPC ...... G08G 1/0129; G08G 1/164; G08G 1/015; G08G 1/0141; G08G 1/0116; G08G 1/166;
(Continued)

(56) References Cited

U.S. PATENT DOCUMENTS

2013/0282268 A1  10/2013  Goerick et al.
2016/0358195 A1  12/2016  Klaczkow et al.
(Continued)

FOREIGN PATENT DOCUMENTS

EP            2950294 A1    12/2015

OTHER PUBLICATIONS

International Preliminary Report on Patentability dated Apr. 18, 2019 from corresponding International Patent Application No. PCT/US2019/012827.

*Primary Examiner* — Michael V Kerrigan (57) ABSTRACT

A method for generating a heat map of a surface area is provided. The method includes receiving sensor data from one or more sensors in communication with a hardware processor and positioned such that the surface area is within a field of view of the one or more sensors. The method also includes identifying one or more traffic participants from the sensor data. Additionally, the method includes determining one or more attributes associated with each one of the one or more traffic participants. The method includes generating the heat map based on the one or more traffic participants and the one or more attributes associated with each one of the one or more traffic participants.

18 Claims, 6 Drawing Sheets

(51) Int. Cl.
   *G08G 1/052* (2006.01)
   *G08G 1/16* (2006.01)
   *G08G 1/015* (2006.01)

(52) U.S. Cl.
   CPC ......... *G08G 1/0133* (2013.01); *G08G 1/0141* (2013.01); *G08G 1/052* (2013.01); *G08G 1/164* (2013.01); *G08G 1/166* (2013.01)

(58) Field of Classification Search
   CPC ...... G08G 1/052; G08G 1/0133; G08G 1/056; G06F 16/29
   See application file for complete search history.

(56) References Cited

U.S. PATENT DOCUMENTS

| | | |
|---|---|---|
| 2017/0011625 A1 | 1/2017 | Stelzig et al. |
| 2017/0124476 A1 | 5/2017 | Levinson et al. |
| 2019/0122037 A1* | 4/2019 | Russell ............. B60W 30/0956 |

* cited by examiner

SYSTEM AND METHOD FOR GENERATING A TRAFFIC HEAT MAP

TECHNICAL FIELD

This disclosure relates to a system and a method for generating a traffic heat map associated with an area, for example, an intersection.

BACKGROUND

Traffic on roads includes traffic participants, such as, but not limited to, vehicles, streetcars, buses, pedestrians, and any other moving object using public roads and walkways or stationary objects such as benches and trash cans. Organized traffic generally has well established priorities, lanes, right-of-way, and traffic control intersections. Traffic may be classified by type: heavy motor vehicle (e.g., car and truck), other vehicle (e.g., moped and bicycle), and pedestrian. It is desirable to have a system and method for monitoring the traffic to determine traffic patterns during a specific day of the week and or a specific time of day.

SUMMARY

One aspect of the disclosure provides a method for generating a heat map of a surface area. The method includes receiving, at a hardware processor, sensor data from one or more sensors in communication with the hardware processor and positioned such that the surface area is within a field of view of the one or more sensors. The method also includes identifying, at the hardware processor, one or more traffic participants from the sensor data. The method also includes determining, at the hardware processor, one or more attributes associated with each one of the one or more traffic participants. The method also includes generating, at the hardware processor, the heat map based on the one or more traffic participants and the one or more attributes associated with each one of the one or more traffic participants.

Implementations of the disclosure may include one or more of the following optional features. In some implementations, the method further includes classifying, at the hardware processor, the one or more traffic participants into classes based on the attributes associated with each one of the one or more traffic participants. In some examples, the classes include a vehicle class and a pedestrian class. In some examples, the one or more attributes includes a speed of each one of the traffic participants, and a direction of each one of the traffic participants.

In some implementations, the method further includes: dividing, at the hardware processor, the heat map into a grid having one or more cells. The method may also include determining, at the hardware processor, a probability of one of the traffic participants in a first cell moving to an adjacent second cell based on a pattern of motion of similar traffic participants.

The method may include overlaying the heat map over a geographic map of the surface area resulting in a geographic-heat map. Overlaying the heat map over a geographic map of the surface area may include: receiving, at the hardware processor, a sensor geographic location associated with each one of the one or more sensors from the one or more sensors; identifying, at the hardware processor, the sensor geographic location of each one of the one or more sensors on the heat map based on the sensor geographic location as a first set of reference points; identifying, at the hardware processor, the sensor geographic location of each one of the one or more sensors on the geographic map as a second set of reference points; and overlaying, at the hardware processor, the first set of reference points over the second set of reference points resulting in the geographic-heat map. In some examples, the method further includes determining, at the hardware processor, traffic participant boundaries based on the heat map, where each boundary identifies traffic lanes, crosswalks, and/or pedestrian lanes of the surface area.

Another aspect of the disclosure provides a traffic monitoring system for generating a heat map of a surface area. The system includes a hardware processor and hardware memory in communication with the hardware processor. The hardware memory stores instructions that when executed on the hardware processor cause the hardware processor to perform operations including the method described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Autonomous and semi-autonomous driving has been gaining interest in the past few years. To increase transportation safety of autonomous and semi-autonomous vehicles, it is important to have an accurate idea of the infrastructure (i.e., roads, lanes, traffic signs, crosswalks, sidewalks, etc.) that is being used by these vehicles, and know the active participants (e.g., vehicles, pedestrians, etc.) using the infrastructure. A vehicle-traffic system as described below quantifies this information as a heat map, which may be used by the autonomous and semi-autonomous vehicles to improve driving accuracy and thus transportation safety.

Figure 1:
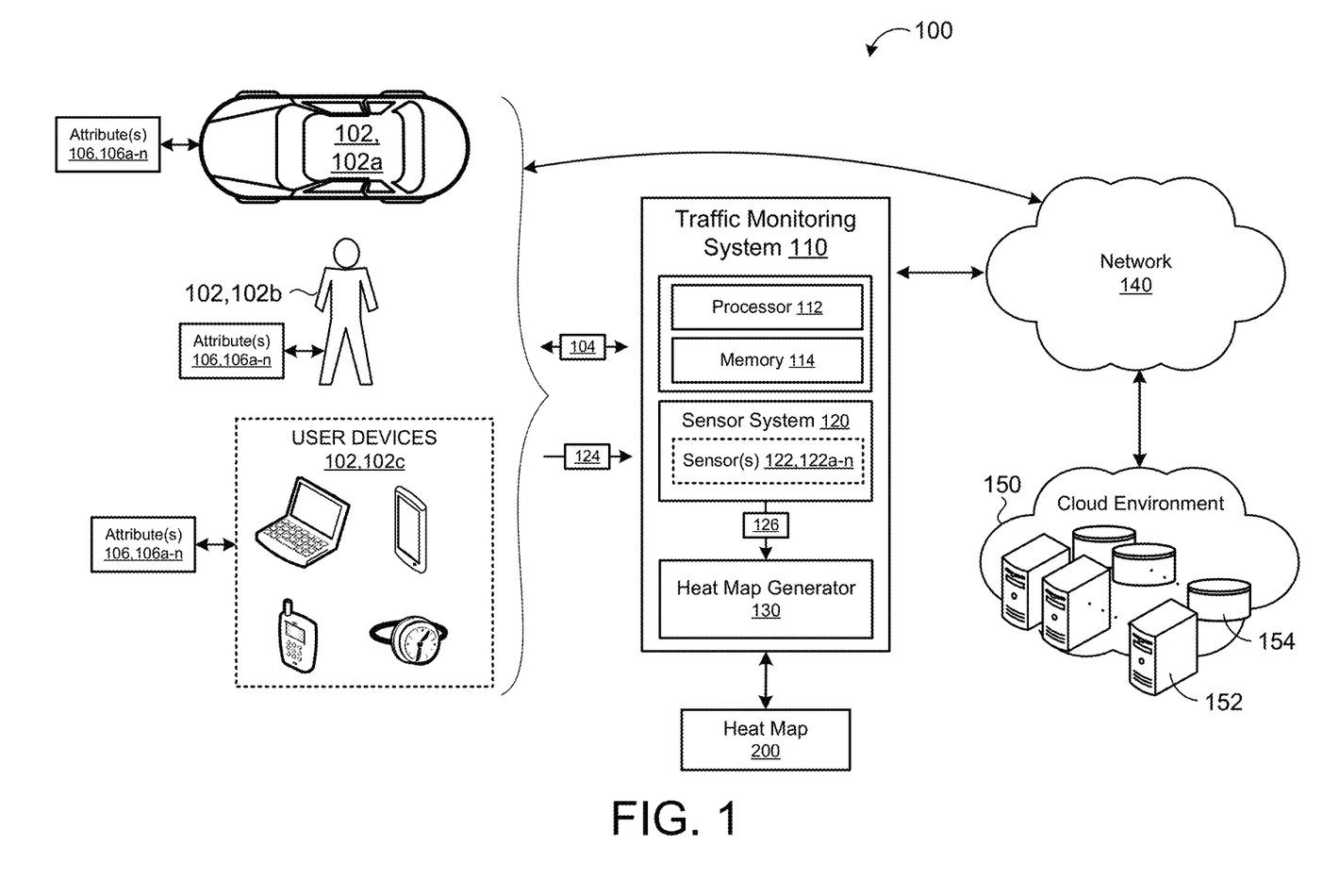
FIG. 1 is a schematic view of an exemplary overview of a vehicle-traffic system.
Figure 2A:
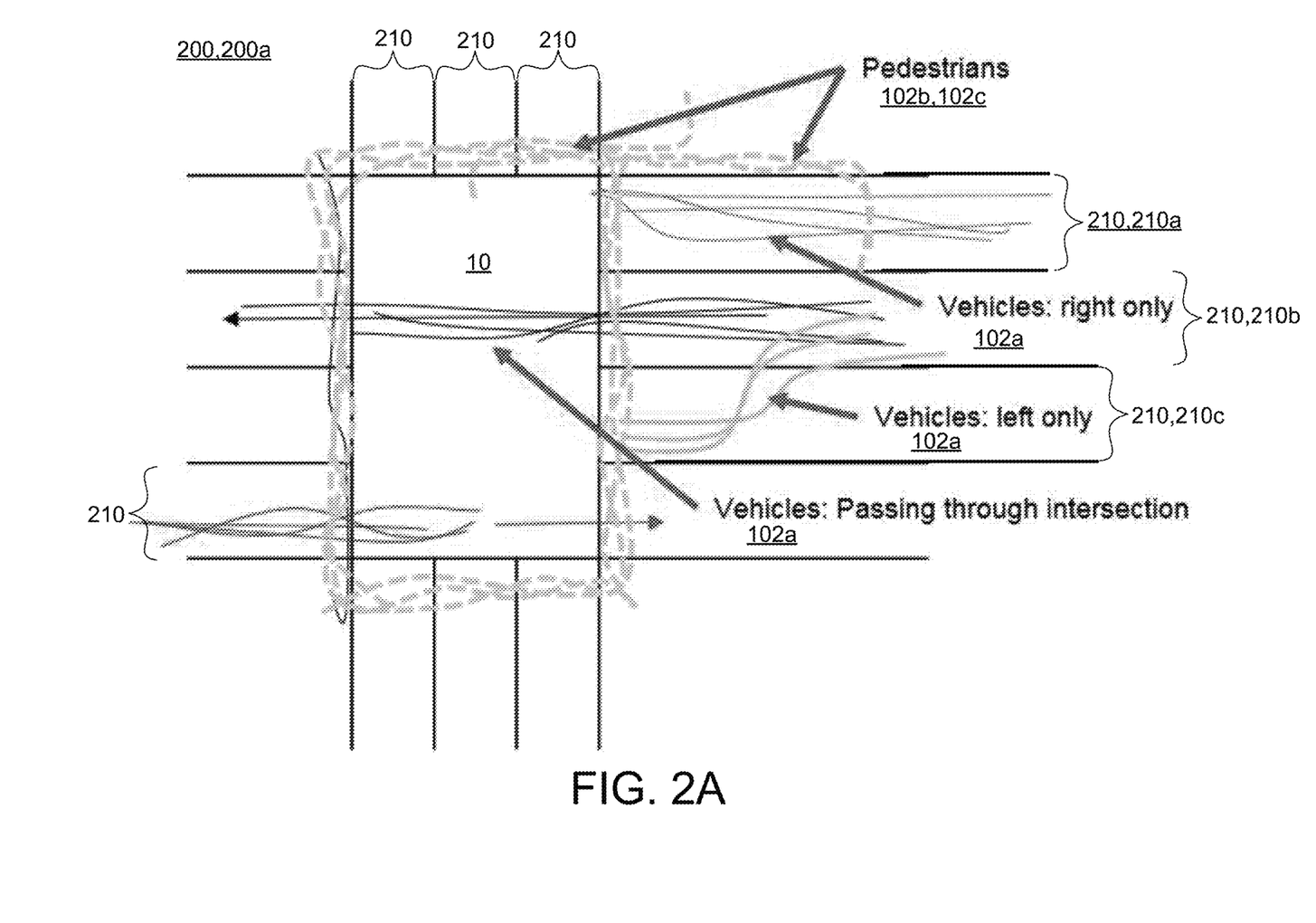
FIG. 2A is a schematic view of an exemplary heat map.
Figure 2B:
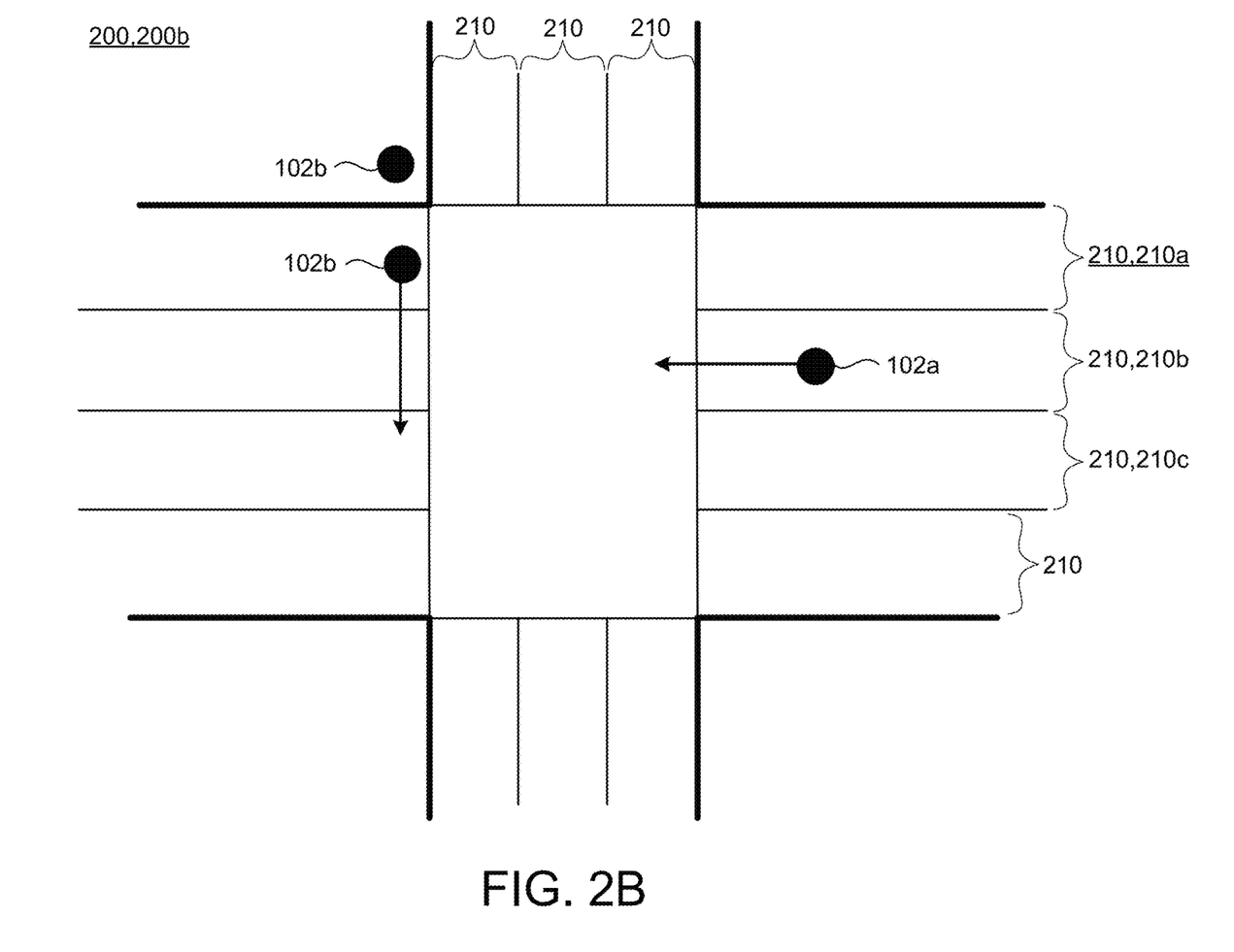
FIG. 2B is a schematic view of an exemplary road boundary map based on the heat map.
Figure 2C:
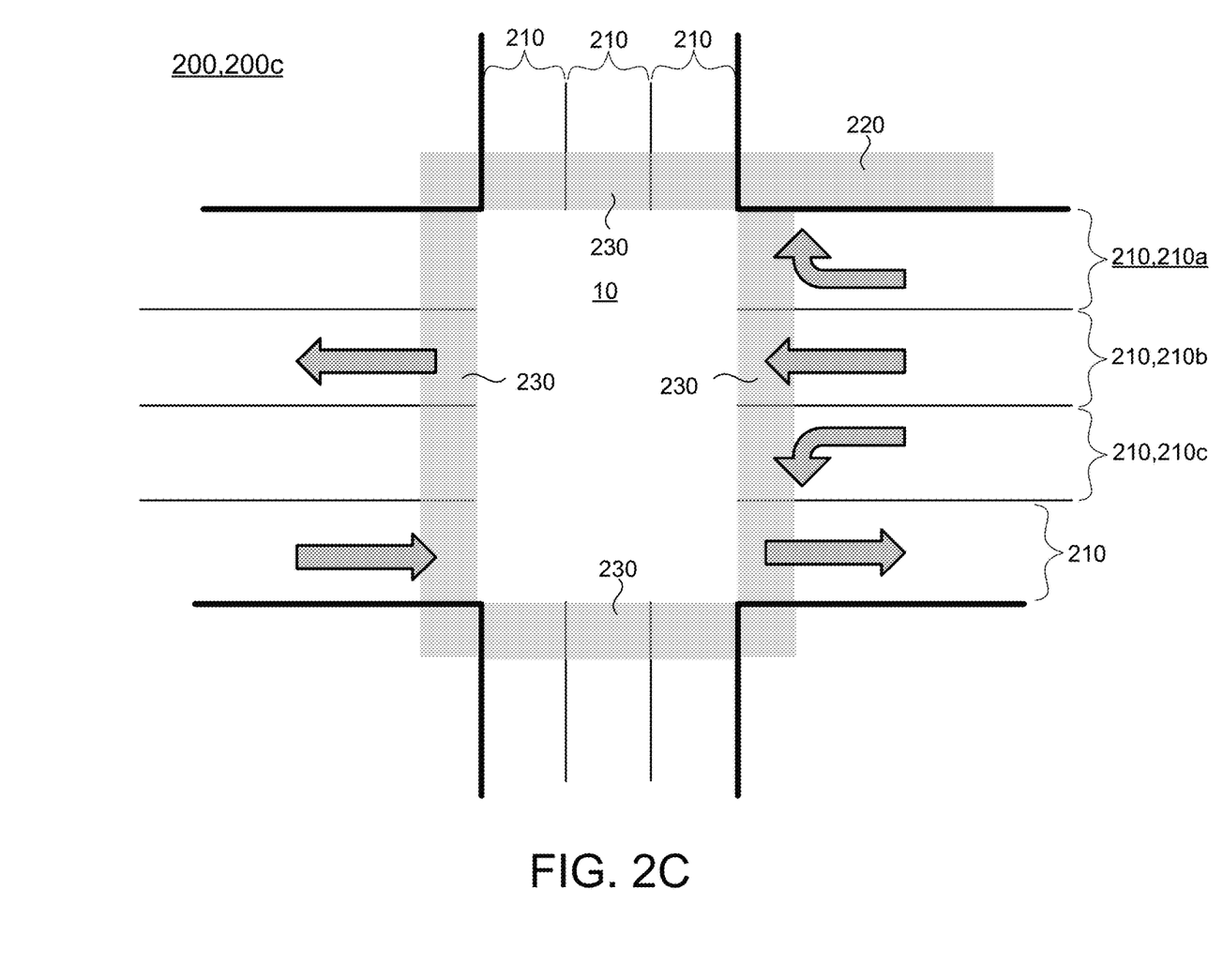
FIG. 2C is a schematic view of an exemplary geographical heat map based on the heat map and a geographic map.

Referring to FIGS. 1-2C, a vehicle-traffic system 100 includes a traffic monitoring system 110 that includes a computing device (or hardware processor) 112 (e.g., central processing unit having one or more computing processors) in communication with non-transitory memory or hardware memory 114 (e.g., a hard disk, flash memory, random-access memory) capable of storing instructions executable on the computing processor(s) 112. The traffic monitoring system 110 includes a sensor system 120. The sensor system 120 includes one or more sensors 122a-n positioned at one or more roads or road intersections 10 and configured to sense one or more traffic participants 102, 102a-c. Traffic participants 102, 102a-c may include, but are not limited to, vehicles 102a, pedestrians and bicyclists 102b, user devices 102c. In some implementations, the user device 102c is any computing device capable of communicating with the sensors 122. The user device 102c may include, but is not limited to, a mobile computing device, such as a laptop, a tablet, a smart phone, and a wearable computing device (e.g., headsets and/or watches). The user device 102c may also include other computing devices having other form factors, such as a gaming device.

In some implementations, the one or more sensors 122a-n may be positioned to capture data 124 associated with a specific area 10, where each sensor 122a-n captures data 124 associated with a portion of the area 10. As a result, the sensor data 124 associated with each sensor 122a-n includes sensor data 124 associated with the entire area 10. In some examples, the sensors 122a-n are positioned within the intersection 10, for example, each sensor 122a-n is positioned on a corner of the intersection to view the traffic participants 102 or supported by a traffic light. The sensors 120 may include, but are not limited to, Radar, Sonar, LIDAR (Light Detection and Ranging, which can entail optical remote sensing that measures properties of scattered light to find range and/or other information of a distant target), HFL (High Flash LIDAR), LADAR (Laser Detection and Ranging), cameras (e.g., monocular camera, binocular camera). Each sensor 120 is positioned at a location where the sensor 120 can capture sensor data 124 associated with the traffic participants 102, 102a-c at the specific location. Therefore, the sensor system 120 analyses the sensor data 124 captured by the one or more sensors 122a-n. The analysis of the sensor data 124 includes the sensor system 120 identifying one or more traffic participants 102 and determining one or more attributes 106, 106a-n associated with each traffic participant 102. The traffic attributes 106, 106a-n, may include, but are not limited to, the location of the traffic participant 102 (e.g., in a coordinate system), a speed associated with the traffic participant 102, a type of the traffic participant 102 (e.g., vehicles 102a, pedestrians and bicyclists 102b, user devices 102c), and other attributes of each traffic participant 102 within the area 10.

The traffic monitoring system 110 executes a heat map generator 130 that generates a heat map 200, 200a, as shown in FIG. 2A, based on the analyzed sensor data 126 received from the sensor system 120. Therefore, the sensors 122a-n capture sensor data 124 associated with an area 10, such as a road or intersection, then the sensor system 120 analyses the received sensor data 124. Following, the heat map generator 130 determines a traffic heat map 200a of the respective area based on the analyzed sensor data 126. The heat map 200a is based on an occurrence of an object or traffic participant 102, 102a-c within the specific area 10. As the number of traffic participants 102, 102a-c increases within the area 10, a heat-index associated with the area 10 increases as well. As shown in FIG. 2A, a path of each traffic participant 102, 102a-c is shown, and the heat-index of each path increases when the number of traffic participants 102, 102a-c taking that path increases. No a-priori information about the area 10 is needed by the traffic monitoring system 110 since all relevant information, such as sensor metadata (i.e., sensor location, for example, a relative position of each sensor 122, 122a-n in a coordinate system and/or with respect to one another) associated with each sensor 122, 122a-n are known and the received sensor data 124 is captured and collected. Therefore, the traffic monitoring system 110 generates the heat map 200a to understand the geometry and geography of the area based on the received sensor data 124 associated with each of the sensors 122a-n.

Vehicle-to-everything (V2X) communication is the flow of information from a vehicle to any other device, and vice versa. More specifically, V2X is a communication system that includes other types of communication such as, V2I (vehicle-to-infrastructure), V2V (vehicle-to-vehicle), V2P (vehicle-to-pedestrian), V2D (vehicle-to-device), and V2G (vehicle-to-grid). V2X is developed with the vision towards safety, mainly so that the vehicle is aware of its surroundings to help prevent collision of the vehicle with other vehicles or objects. In some implementations, the traffic monitoring system 110 communicates with the traffic participants 102 via V2X by way of a V2X communication 104, and the traffic participant 102 sends one or more attributes of the traffic participant 102 to the traffic monitoring system 110 by way of the V2X communication 104. Therefore, the traffic monitoring system 110 may analyze the V2X communication to determine one or more attributes 106 associated with the respective traffic participant 102.

In some examples, the traffic monitoring system 110 is in communication with a remote system 150 via the network 140. The remote system 150 may be a distributed system (e.g., a cloud environment) having scalable/elastic computing resources 152 and/or storage resources 154. The network 140 may include various types of networks, such as a local area network (LAN), wide area network (WAN), and/or the Internet. In some examples, the traffic monitoring system 110 executes on the remote system 150 and communicates with the sensors 122 via the network 140. In this case, the sensors 122 are positioned at the intersection to capture the sensor data 124. Additionally, in this case, the traffic participants 102 may communicate with the traffic monitoring system 110 via the network 140, such that the traffic participants 102 send the traffic monitoring system 110 one or more attributes 106 associated with the traffic participant 102.

Learning Intersection Attributes from Sensor Data

In some implementations, the heat map generator 130 learns patterns of traffic participants 102, 102a-c based on the analyzed sensor data 126 received from the sensor system 120 (including the attributes 106 associated with each traffic participant 102). Additionally, in some examples, the heat map generator 130 determines a map of the area 10 based on the analyzed sensor data 126. For example, the heat map generator 130 determines a vehicle lane 210 or a pedestrian lane 2 based on an average traffic participant attributes 106 in those lane limits by considering an occupancy probability threshold and cell movement probabilities. The heat map generator 130 may divide the heat map 200a into cells, and cell movement is indicative of a traffic participant 102 moving from one cell to another adjacent cell. The heat map generator 130 identifies one or more boundaries, such as a traffic lane 210 (e.g., left, straight, right), a pedestrian lane or a sidewalk 220, a cycling lane (not shown), etc. based on the received sensor data 124. For example, the traffic monitoring system 110 may determine a boundary to be a traffic lane 210 based on a speed of the traffic participant 102 (e.g., the speed of the traffic participant 102 determined based on the sensor data 124 as one of the participant attributes 106). The heat map generator 130 may consider other factors for determining the type of area boundary 210, 220, 230. The heat map generator 130 may determine that within the area boundary 210, 220, 230 identified as a traffic lane 210, a traffic participant 102, 102a-c identified as a vehicle 102a, slows down followed by making a right turn. In this case, the heat map generator 130 determines that the vehicle 102a is in the right lane 210a. In some examples, the heat map generator 130 determines that the vehicle 102a is moving through the intersection at about a constant speed. In this case, the heat map generator 130 determines that the vehicle 102a may be in a no-turn lane 210b within the intersection, i.e., a lane that does not allow for a left turn or a right turn at the intersection and continues straight. In another example, the heat map generator 130 may determine that within a traffic lane 210, a vehicle 102a switches lanes as it approaches an intersection, then slows down, then stops. In this case, the heat map generator 130 determines that the lane is a left turn only lane 210c.

Moreover, the heat map generator 130 may identify a boundary as a cycle lane or based on high density cyclists based on the attributes 106 associated with each traffic participant 102. In some examples, the heat map generator 130 identifies the boundary as a sidewalk or a crosswalk 230 where the pedestrians walk the most. In some examples, the heat map generator 130 determines an overlap between a portion of the traffic lanes 210 at a first time and pedestrian boundaries at a second time. In this case, the heat map generator 130 determines that the traffic boundary is a pedestrian crosswalk 230.

In some examples, the heat map generator 130 generates the heat map 200a and divides the heat map 200a into cells (not shown). Some cells may be associated with cell attributes, such as crosswalk, pedestrian traffic light, cyclist lane, vehicle lane.

Based on the received sensor data 124 and the generated heat map 200a, the heat map generator 130 may classify the area or intersection 10 as having slow traffic, moderate traffic, or heavy traffic based on its density of traffic participants 102, 102a-c during certain times of a day. For example, an intersection 10 around a business area may be identified as slow on a Sunday afternoon and busy on a Monday morning. The traffic classification of the area 10 may be useful when routing and navigating vehicles, for example, avoiding high traffic areas.

In some implementations, by monitoring the intersection 10, the heat map generator 130 can identify conflict zones or "blind spots" where the chances of collision or accident is high. For example, the heat map generator 130 may monitor the position and speed of two traffic participants 102, if the two traffic participants 102 are seen moving towards each other at a steady speed but stop suddenly very close to each other almost at the same time, the traffic monitoring system 110 may determine that the occurrence is a near-miss situation. If the heat map generator 130 observes the same occurrence few more times over a time period of time at the same part of the intersection 10, the heat map generator 130 confirms its assessment of the conflict zone or blind spot. The heat map generator 130 may communicate this information with the traffic participants 102 that are entering or getting close to such conflict zones.

Assigning Criticality to Traffic Participants

An intersection 10 may include any area where a traffic participant 102 is positioned or may be positioned, for example, vehicle lanes, crosswalks, road surface, and sidewalks for pedestrians, etc. In some examples, the surface area of the intersection 10 is divided into a grid that includes orthogonal square-shaped cells (not shown). When the sensor 120 detects a traffic participant 102, the heat map generator 130 associates the detected traffic participant 102 with one of the cells within the grid. As such, the heat map generator 130 may determine a probability of other cells being occupied based on the occupancy of the current cell. For example, if the traffic participant 102 is identified to be a pedestrian 102b walking in a certain direction within a cell associated with a sidewalk 220, then the heat map generator 130 may determine that an adjacent cell positioned forward of the occupied cell and being identified as a sidewalk 220 may be occupied by the pedestrian 102b as opposed to an adjacent cell associated with a traffic lane 210.

The heat map generator 130 may track the movement of a traffic participant 102 within the intersection 10 and predict the movement of the traffic participant 102. As such, the heat map generator 130 may predict a probability of two or more traffic participants 102 being in the same cell at a future point in time. Therefore, the heat map generator 130 may assign a criticality value to each traffic participant 102. For example, the heat map generator 130 may predict the movement of a moving vehicle 102a within a vehicle lane 210 and the movement of a walking pedestrian 102b on a crosswalk 230. Based on the predicted movement of the moving vehicle 102a and the walking pedestrian 102b, the heat map generator 130 may predict a probability of the vehicle 102a and the pedestrian 102b being in the same cell at a future time. If such a probability is high, then the heat map generator 130 assigns a high criticality value to both the vehicle 102a and the pedestrian 102b, and the heat map generator 130 may either alert the pedestrian 102b (e.g., via a user device 102c) or alert the vehicle 102a, or alert both of the high probability of both being at the same location (i.e., cell). In other examples, if a bicyclist 102b is waiting at a red light adjacent to an occupied vehicle lane 210, then the heat map generator 130 may assign a low criticality value to the bicyclist and the vehicle 102a in the occupied lane. However, if the bicyclist 102b is approaching a lane crosswalk 230 at a constant speed without slowing down for the vehicles 102a driving within the lanes 210 and approaching the intersection, then the heat map generator 130 may assign a high criticality value to the bicyclist 102b and the vehicle 102a since they both may be at the same position, e.g., crosswalk 230, at a point in the future.

Predicting the Behavior of Traffic Participants from the Heat Map

As previously mentioned, the heat map generator 130 may determine a probability of one or more traffic participants 102, 102a-c being at the same cell at a certain time. The heat map generator 130 may receive sensor data 124 associated with each traffic participant 102, 102a-c and associate attributes to each traffic participants 102. In some examples, the heat map generator 130 stores the received sensor data 124 and/or the analyses sensor data 126 (including the attributes 106) in the hardware memory 114. The heat map generator 130 may then execute a regression model on the hardware processor 112 in communication with the memory 114 to predict the position of each of the traffic participants 102, 102a-c in the intersection 10 at a specific time. The regression model may predict the position of the traffic participants 102, 102a-c within a cell of the identified grid and or the movement of the traffic participant 102 towards a specific cell or an adjacent cell. The cell-based approach executed by the heat map generator 130 helps in estimating the probability of a traffic participant 102, 102a-c moving to an adjacent cell.

Overlaying the Heat Map onto Other Maps

In some implementations, the heat map generator 130 generates the heat map 200 based on the sensor data 124 and overlays the heat map 200 on other types of maps, e.g., a geographic map, a street map, an intersection map, to name a few, to enhance sensor detection and representation of objects resulting in a geographic-heat map 200c as shown in FIG. 2C. The traffic monitoring system 110 may use extrinsic calibration parameters associated with the sensors 120 to generate a correspondence matrix between the generated heat map 200a and the other types of map. For example, the extrinsic calibration parameters associated with the sensors 122 may include the location of each sensor 122 in a coordinate system which may be overlain on the geographic map. As such, the resulting map 200c (i.e., the heat map and the other map overlaid) shown in FIG. 2C, provides a better representation of the traffic participants 102, objects (e.g., street lights, trash cans, mail boxes, etc.), vehicle lanes 210, sidewalk 220, and crosswalks 230.

In some examples, the traffic monitoring system 110 identifies a traffic participant 102 and associates a class with the traffic participants 102. For example, vehicles 102a are in a different class than pedestrians or bicyclists 102b. In some implementations, the heat map generator 130 determines what class a traffic participant 102 belongs to, then the heat map generator 130 can use the generated heat map 200a to confirm the class of the traffic participant 102 based on the heat signature of the traffic participant 102.

Once the heat map generator 130 generates the heat map 200a from the sensor data 124, the heat map 200 shows what part of the intersection 10 is mostly occupied with which class of traffic participants 102. A probability of a vehicle 102a moving in a lane 210 is very high whereas a probability of a pedestrian 102b in the crosswalk 230 is high. In some examples, a new sensor 120 (such as, but not limited to a LIDAR) is added to the sensor system 120, where the new sensor 120 may include a classifier logic for grouping the traffic participants 102 based on their class. The classifier logic may be trained using annotated sensor dataset (i.e., image dataset). Training the classifier logic is generally a labor-intensive task but with knowledge of the heat map 200a and the location of a particular class of traffic participant 102 is most likely to be on the map, the sensor data 124 (i.e., image) may be overlaid with the heat map information. This will result in semi-annotation of the images which results in a less labor-intensive classifier logic training.

Traffic Estimation

The heat map generator 130 may determine the flow of traffic based on the number of traffic participants 102 during a period of time. For example, a higher number or a larger cluster of pedestrians 102b passing through a crosswalk 230 or gathered at a sidewalk 220 adjacent the edges of a learned crosswalk may indicate busy times of the day. As another example, longer vehicle lane lines 210 of vehicles 102a waiting at a red light is another indicator of a busy intersection 10. Therefore, the heat map generator 130 may identify one or more traffic patterns from the heat map 220a. The patterns may be used to estimate future traffic. For example, the heat map generator 130 determines that at a specific intersection 10, every Monday at 8 am there are long lane lines of vehicles 102a waiting at the red light, which means the intersection 10 has heavy traffic. Therefore, the heat map generator 130 can predict that a following Monday at 8 am, the same intersection 10 will also have heavy traffic. Therefore, the heat map generator 130 may estimate future traffic. In some examples, the traffic monitoring system may communicate the estimated future traffic data with one or more other systems or one or more other vehicles and/or user devices via V2X or the network 140.

Anomaly Detection

The heat map generator 130 may store the heat map 200a in hardware memory 114 and continuously update the heat map 200a while receiving sensor data 124. Additionally, the heat map generator 130 analyses the heat map 200a over time and generates traffic data and traffic patterns associated with each class of traffic participants 102 based on the stored heat maps 200 based on days of the week and time of day.

In some examples, the heat map generator 130 analyses the traffic data and detects occurrences such as accidents or random appearances of traffic participant 102 within the intersection 10.

In some implementations, the heat map generator 130 determines that the speed of traffic participants 102 is different from a pattern of the traffic participants 102 previously identified (by the heat map generator 130 as stored in the memory 114). For example, the heat map generator 130 receives analyzed data 126 associates with an intersection 10 at a current time. The heat map generator 130 determines that if the speed of vehicles 102a currently driving in the intersection 10 is less than a previously identified average speed of vehicles 102a (class of vehicles), then the heat map generator 130 may determine that such a reduction in vehicle speed is due to an accident or poor visibility (weather conditions).

Classifying Traffic Participants and Adjusting Confidence Levels of Detected Objects In some implementations, the heat map generator 130 determines an attribute 106, such as a speed and a position of a traffic participant 102, however, the heat map generator 130 might not accurately identify the traffic participant 102 (e.g., vehicle 102a, pedestrian 102b, user device 102c). In some examples, the heat map 200a includes a vehicle heat map, a pedestrian heat map, and a bike heat map. Therefore, when a traffic participant 102 is classified, the heat signature associated with the identified traffic participant 102 is stored in its respective heat map. Therefore, it is important to correctly identify the class of each traffic participant 102.

In some implementations, when the traffic participant 102 is not classified or is misclassified, the heat map generator 130 may consider the stored heat map 200a (including the heat map associated with each traffic participant) to identify the traffic participant 102. For example, the heat map generator 130 determines the position of the unidentified traffic participant 102 within the heat map 200. If the unidentified traffic participant 102 is moving fast or within a range of average speed of traffic participants 102 within a vehicle lane 210 identified by the heat map 200a, then the unidentified traffic participant 102 is a vehicle 102a. The heat map generator 130 may identify the lane boundaries within the heat map 200 based on certain threshold occupancy probabilities as preciously described. Additionally or alternatively, the heat map generator 130 may identify that the traffic participant 102 is positioned or moving along a path in the heat map 200 which is a path identified to have a probability of a certain type of traffic participant 102. For example, if the traffic participant 102 is positioned in an area of the heat map 200 identified as a vehicle lane, then the unidentified traffic participant 102 is identified as a vehicle 102a. In some examples, the heat map generator 130 determines the travel path of the unidentified traffic participant 102 based on the cells (not shown) identified within the grid. In this case, the heat map generator 130 determines a probability of the unidentified traffic participant 102 moving to a second cell, and thus, the heat map generator 130 plans the path of the unidentified traffic participant 102. Based on the planned path, the heat map generator 130 may identify the unidentified traffic participant 102. For example, if the planned path is similar to a path that vehicles 102a take on the heat map 200, then the unidentified traffic participant is a vehicle 102a.

Generating the Heat Map Based on the Sensor Data

In some implementations, the heat map generator 130 analyses the received sensor data 124, 126 to monitor traffic and generate traffic patterns for the area 10. In addition, the heat map generator 130 may identify a traffic participant 102 as a vehicle 102a, a a bicyclist or pedestrian 102b, or a user device 102c, among others. The heat map generator 130 may generate the heat map 200a based on the type of traffic participant 102, for example, a vehicle heat map or a pedestrian heat map. The heat map generator 130 may also generate a heat map 200a including all traffic participants 102 which shows the classes of traffic participants 102.

In some examples, the traffic monitoring system 110 receives the sensor data 124 and the heat map generator 130 determines an average of the attributes of the moving traffic participants 102 that results in generating the heat map 200a, for example a heat map 200a associated with each class of traffic participant. Moreover, the heat map generator 130 determines the average (and sigma) speed of each one of the traffic participants 102, the average (and sigma) acceleration of each one of the traffic participants 102, the probability of each one of the traffic participants 102 moving into each adjacent cells, and existing stationary objects to determine the occupancy probability of the traffic participant 102 within each cell.

Classifier weights In some implementation, the heat map 200a includes information such as a number or a density of traffic participants 102 at a given time of day/week/month/year. The heat map generator 130 may associate weights with each class of traffic participants 102 for determining future traffic based on stored traffic patterns. For example, pedestrian traffic is high in the evenings or before and after office hours; pedestrian traffic is higher on one crosswalk compared to others, higher in summer; moving vehicles numbers/density higher before and after office hours with higher average speed; higher vehicle density in one lane and empty other lanes may be indicative of lane closures/road work; special days like Christmas eve or events like sport games may also be considered when determining the heat map 200a or the future traffic prediction based on a stored heat map 200a.

In some examples, the heat maps 200 can be used to evaluate the criticality of traffic participants 102. For example, if a pedestrian is in a cell of associated with a vehicle heat map having high vehicle probability then this pedestrian 102b has a high criticality. In other words, the pedestrian 102b should not be in the cell associated with the vehicle heat map 200a. In some examples, the heat map generator 130 can notify an incoming vehicle 102a having a high probability of approaching the cell and/or the pedestrian 102b (via a pedestrian user device 102c) of the pedestrian 102b being in the vehicle lane.

In some implementation, the traffic monitoring system 110 uses the heat map 200a to trigger different warning and intersection functions. For example, when a pedestrian 102b is on or adjacent to a cell associated with a crosswalk 230 then the traffic light may be switched. In another example, if the pedestrian 102b is on an adjacent cell associated with the crosswalk 230 with pedestrian traffic light and the light has a request from green and the pedestrian is leaving the cell then the request could be canceled.

Figure 3:
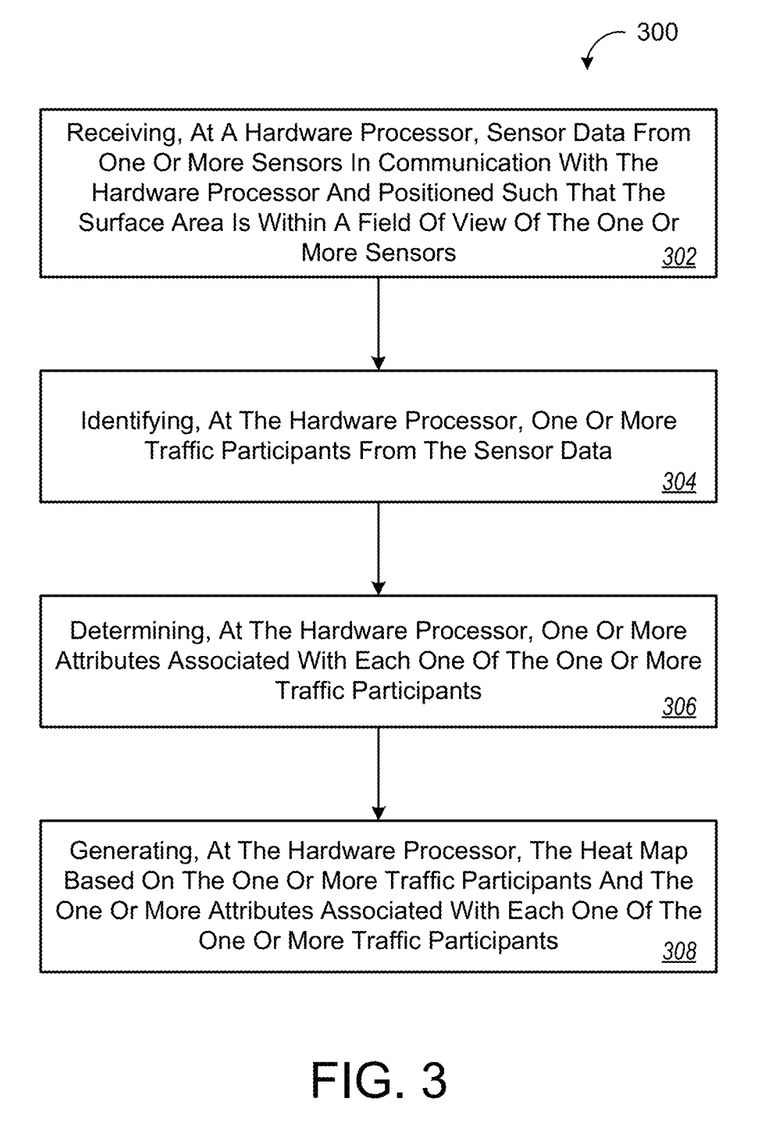
FIG. 3 is a schematic view of an exemplary arrangement of operations for determining traffic patterns of an area based on the heat map shown in FIG. 2A.

FIG. 3 provides an example arrangement of operations for a method 300 for generating a heat map of a surface area using the system 100 of FIGS. 1-2C. At block 302, the method 300 includes receiving, at a hardware processor 112, sensor data 124 from one or more sensors 122 in communication with the hardware processor 112 and positioned such that the surface area 10 is within a field of view of the one or more sensors 122. At block 304, the method 300 includes identifying, at the hardware processor 112, one or more traffic participants 102 from the sensor data 124. At block 306, the method 300 includes determining, at the hardware processor 112, one or more attributes 106 associated with each one of the one or more traffic participants 102, 102a-c. Additionally, at block 308, the method 300 includes generating, at the hardware processor 112, the heat map 200a based on the one or more traffic participants 102, 102a-c and the one or more attributes 106, 106a-n associated with each one of the one or more traffic participants 102, 102a-c.

In some implementations, the method 300 also includes classifying, at the hardware processor 112, the one or more traffic participants 102, 102a-c into classes based on the attributes 106, 106a-n associated with each one of the one or more traffic participants 102, 102a-c. The classes may include a vehicle class and a pedestrian class. In some examples, the one or more attributes 106, 106a-n includes a speed of each one of the traffic participants 102, 102a-c, and a direction of each one of the traffic participants 102, 102a-c.

In some implementations, the method 300 further includes dividing, at the hardware processor 112, the heat map 220a into a grid having one or more cells. The method 300 also includes determining, at the hardware processor 112, a probability of one of the traffic participants 102, 102a-c in a first cell moving to an adjacent second cell based on a pattern of motion of similar traffic participants.

The method may further include overlaying the heat map 220a over a geographic map of the surface area 10 resulting in a geographic-heat map 220c. In some examples, overlaying the heat map 220a over a geographic map of the surface area 10 includes: receiving, at the hardware processor 112, a sensor geographic location associated with each one of the one or more sensors 122, 122a-n from the one or more sensors 122, 122a-n; and identifying, at the hardware processor 112, the sensor geographic location of each one of the one or more sensors 122, 122a-n on the heat map 20a based on the sensor geographic location as a first set of reference points. The method 300 also includes identifying, at the hardware processor 112, the sensor geographic location of each one of the one or more sensors 122, 122a-n on the geographic map as a second set of reference points; and overlaying, at the hardware processor 112, the first set of reference points over the second set of reference points resulting in the geographic-heat map 220c. In some examples, the method also includes determining, at the hardware processor 112, traffic participant boundaries 210, 220, 230 based on the heat map 230a, where each boundary 210, 220, 230 identifies traffic lanes 210, crosswalks 230, and/or pedestrian lanes 220 of the surface area.

Figure 4:
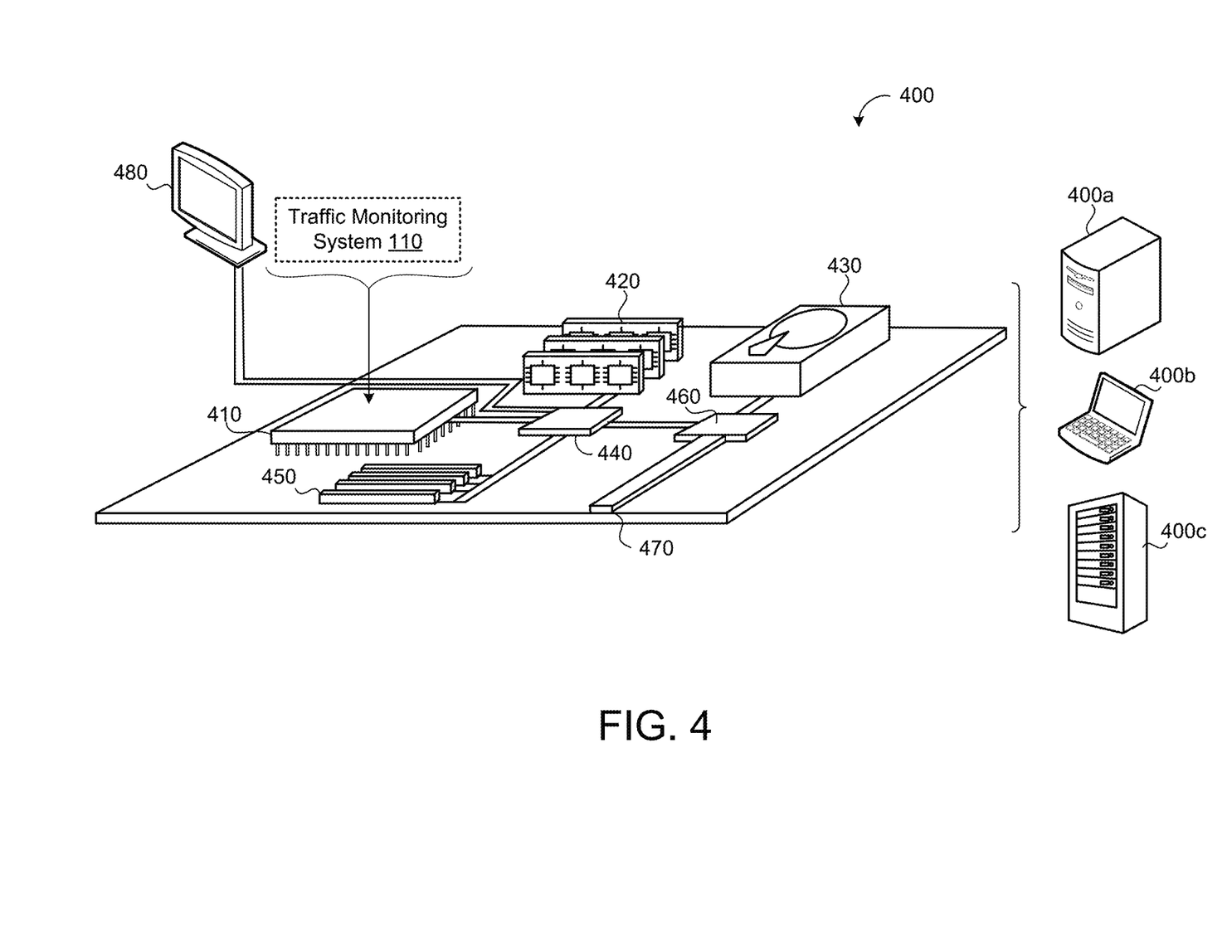
FIG. 4 is a schematic view of an example computing device executing any system or methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to low speed bus 470 and storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high-speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and low-speed expansion port 470. The low-speed expansion port 470, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for generating a heat map of a surface area, the method comprising:
   receiving, at a hardware processor, sensor data from one or more sensors in communication with the hardware processor and positioned such that the surface area is within a field of view of the one or more sensors;
   identifying, at the hardware processor, one or more traffic participants from the sensor data;
   determining, at the hardware processor, one or more attributes associated with each one of the one or more traffic participants;

identifying at least one traffic lane based upon the one or more attributes associated with the one or more traffic participants, assigning a heat index to the at least one traffic lane based upon a number of the one or more traffic participants associated with the at least one traffic lane; and generating, at the hardware processor, the heat map based on the one or more traffic participants, the heat index and the one or more attributes associated with each one of the one or more traffic participants.

2. The method of claim 1, further comprising classifying, at the hardware processor, the one or more traffic participants into classes based on the attributes associated with each one of the one or more traffic participants.

3. The method of claim 2, wherein the classes include a vehicle class and a pedestrian class.

4. The method of claim 1, wherein the one or more attributes include a speed of each one of the traffic participants, and a direction of each one of the traffic participants.

5. The method of claim 1, further comprising:
dividing, at the hardware processor, the heat map into a grid having one or more cells; and
determining, at the hardware processor, a probability of one of the traffic participants in a first cell moving to an adjacent second cell based on a pattern of motion of similar traffic participants.

6. The method of claim 1, further comprising overlaying the heat map over a geographic map of the surface area resulting in a geographic-heat map.

7. The method of claim 6, wherein overlaying the heat map over the geographic map of the surface area comprises:
receiving, at the hardware processor, a sensor geographic location associated with each one of the one or more sensors from the one or more sensors;
identifying, at the hardware processor, the sensor geographic location of each one of the one or more sensors on the heat map based on the sensor geographic location as a first set of reference points;
identifying, at the hardware processor, the sensor geographic location of each one of the one or more sensors on the geographic map as a second set of reference points; and
overlaying, at the hardware processor, the first set of reference points over the second set of reference points resulting in the geographic-heat map.

8. The method of claim 1, further comprising determining, at the hardware processor, traffic participant boundaries based on the heat map, wherein each boundary identifies traffic lanes, crosswalks, and/or pedestrian lanes of the surface area.

9. The method of claim 1, wherein the at least one traffic lace further comprises one of a vehicle right turn lane, a vehicle straightaway, a vehicle left turn lane, a pedestrian traffic lane, a pedestrian crosswalk lane, a bicycle traffic lane and a bicycle cross traffic lane.

10. A traffic monitoring system for generating a heat map of a surface area, the system comprising:
a hardware processor; and
hardware non-transitory memory in communication with the hardware processor, the hardware memory storing instructions that when executed on the hardware processor cause the hardware processor to perform operations comprising:
receiving sensor data from one or more sensors in communication with the hardware processor and positioned such that the surface area is within a field of view of the one or more sensors;
identifying one or more traffic participants from the sensor data;
determining one or more attributes associated with each one of the one or more traffic participants;
identifying at least one traffic lane based upon the one or more attributes associated with the one or more traffic participants,
assigning a heat index to the at least one traffic lane based upon a number of the one or more traffic participants associated with the at least one traffic lane; and
generating the heat map based on the one or more traffic participants, the heat index, and the one or more attributes associated with each one of the one or more traffic participants.

11. The system of claim 10, wherein the operations further comprise classifying the one or more traffic participants into classes based on the attributes associated with each one of the one or more traffic participants.

12. The system of claim 11, wherein the classes include a vehicle class and a pedestrian class.

13. The system of claim 10, wherein the one or more attributes include a speed of each one of the traffic participants, and a direction of each one of the traffic participants.

14. The system of claim 10, wherein the operations further include:
dividing the heat map into a grid having one or more cells; and
determining a probability of one of the traffic participants in a first cell moving to an adjacent second cell based on a pattern of motion of similar traffic participants.

15. The system of claim 10, wherein the operations further include overlaying the heat map over a geographic map of the surface area resulting in a geographic-heat map.

16. The system of claim 15, wherein overlaying the heat map over the geographic map of the surface area comprises:
receiving a sensor geographic location associated with each one of the one or more sensors from the one or more sensors;
identifying the sensor geographic location of each one of the one or more sensors on the heat map based on the sensor geographic location as a first set of reference points;
identifying the sensor geographic location of each one of the one or more sensors on the geographic map as a second set of reference points; and
overlaying the first set of reference points over the second set of reference points resulting in the geographic-heat map.

17. The system of claim 16, wherein the operations further include determining traffic participant boundaries based on the heat map, each boundary identifies traffic lanes, crosswalks, and/or pedestrian lanes of the surface area.

18. The system of claim 10, wherein the at least one traffic lace further comprises one of a vehicle right turn lane, a vehicle straightaway, a vehicle left turn lane, a pedestrian traffic lane, a pedestrian crosswalk lane, a bicycle traffic lane and a bicycle cross traffic lane.

* * * * *